(12) United States Patent
Kawai

(10) Patent No.: US 12,542,661 B2
(45) Date of Patent: Feb. 3, 2026

(54) ENCRYPTION APPARATUS, DECRYPTION APPARATUS, DECRYPTION-POSSIBLE VERIFICATION APPARATUS, CRYPTOSYSTEM, ENCRYPTION METHOD, AND COMPUTER READABLE MEDIUM

(71) Applicant: Mitsubishi Electric Corporation, Tokyo (JP)

(72) Inventor: Yutaka Kawai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 79 days.

(21) Appl. No.: 18/669,001

(22) Filed: May 20, 2024

(65) Prior Publication Data

US 2024/0323009 A1 Sep. 26, 2024

Related U.S. Application Data

(63) Continuation of application No. PCT/JP2022/000537, filed on Jan. 11, 2022.

(51) Int. Cl.
*H04L 9/08* (2006.01)

(52) U.S. Cl.
CPC .......... *H04L 9/0869* (2013.01); *H04L 9/0852* (2013.01)

(58) Field of Classification Search
CPC ... H04L 9/0869; H04L 9/0852; H04L 9/0847; H04L 9/088
See application file for complete search history.

(56) References Cited

U.S. PATENT DOCUMENTS

2015/0207630 A1 7/2015 Shimoyama et al.
2017/0293913 A1 10/2017 Gulak et al.
(Continued)

FOREIGN PATENT DOCUMENTS

JP 2015-139014 A 7/2015
JP 2017-112604 A 6/2017
(Continued)

OTHER PUBLICATIONS

Boneh et al., "Fully Key-Homomorphic Encryption, Arithmetic Circuit ABE, and Compact Garbled Circuits", Eurocrypt, May 20, 2014, total 41 pages.
(Continued)

*Primary Examiner* — Sangseok Park
(74) *Attorney, Agent, or Firm* — Birch, Stewart, Kolasch & Birch, LLP

(57) ABSTRACT

An encryption unit (403) that an encryption apparatus (400) includes, when a user secret key SKΓ is generated using a secret key MSK of attribute based encryption and a set of attributes Γ corresponding to a decryption-possible condition L, generates a key K and a ciphertext P corresponding to the key K by encrypting the decryption-possible condition L using, as an encryption key of the attribute based encryption, a key PK consisting of a public key MPK corresponding to the secret key MSK and a public key PQCPK of post quantum cryptography, regards a part of the ciphertext P where the decryption-possible condition L is encrypted based on a secret value as P-D, regards a part of the ciphertext P where the secret value that is shared is encrypted as P-SS, and generates K' and P'-D by randomizing each of the key K and the P-D using a random number R, and generates a ciphertext C by encrypting data consisting of the P-D and the random number R using the public key PQCPK. Here, the P-SS, the P'-D, and the K' are
(Continued)

decryption-possible verification parameters corresponding to the user secret key SKΓ.

6 Claims, 17 Drawing Sheets

(56) References Cited

U.S. PATENT DOCUMENTS

| | | |
|---|---|---|
| 2018/0357933 A1 | 12/2018 | Takashima |
| 2019/0182216 A1 | 6/2019 | Gulak et al. |
| 2019/0205875 A1 | 7/2019 | Gulak et al. |
| 2020/0322142 A1* | 10/2020 | Huang .................. H04L 9/3236 |
| 2022/0052835 A1* | 2/2022 | Eldefrawy ............ H04L 9/0825 |
| 2022/0129892 A1 | 4/2022 | Gulak et al. |

FOREIGN PATENT DOCUMENTS

| | | |
|---|---|---|
| JP | 2017-212699 A | 11/2017 |
| JP | 2019-514301 A | 5/2019 |
| WO | WO 2016/162941 A1 | 10/2016 |
| WO | WO 2017/177313 A1 | 10/2017 |

OTHER PUBLICATIONS

Gorbunov et al., "Attribute-Based Encryption for Circuits", Journal of the ACM (JACM), Dec. 2015, vol. 62, No. 6, p. 1-33.
International Search Report, issued in PCT/JP2022/000537, PCT/ISA/210, dated Apr. 12, 2022.
Okamoto et al., "Fully Secure Functional Encryption with General Relations from the Decisional Linear Assumption", Annual Cryptology Conference Springer, Berlin, Heidelberg, 2010, p. 191-208.
Xavier Boyen, "Attribute-Based Functional Encryption on Lattice", Theory of Cryptography 2013, vol. 7785, total 29 pages.

* cited by examiner

Fig. 15
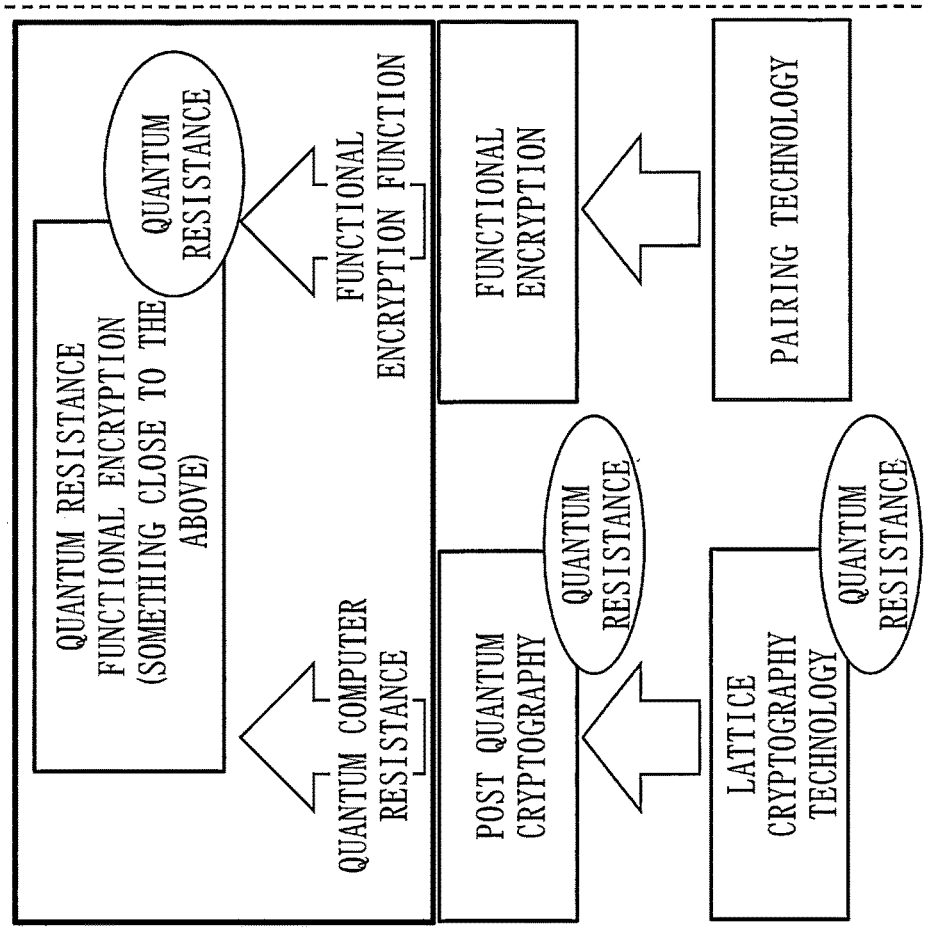
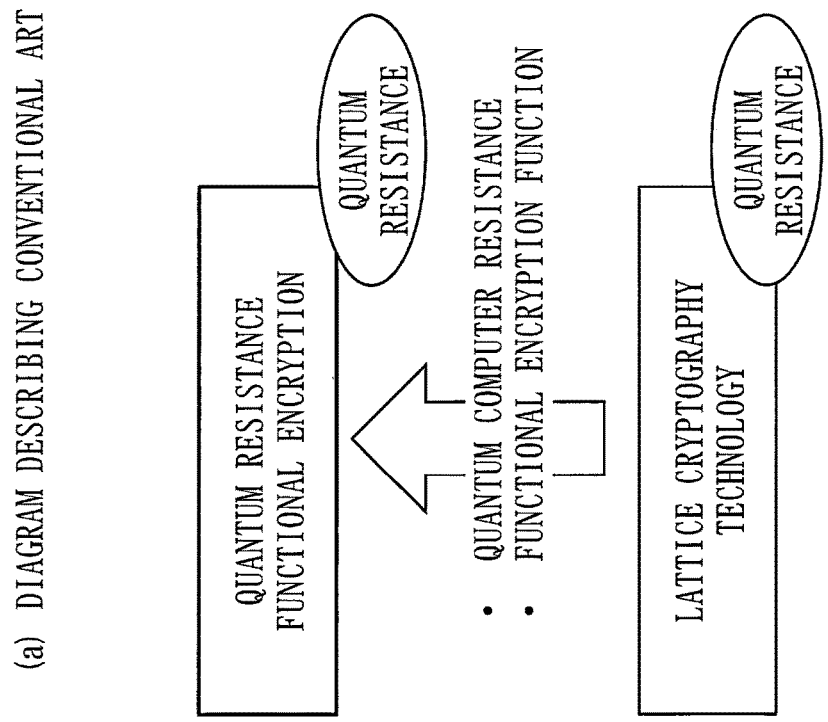

Fig. 16
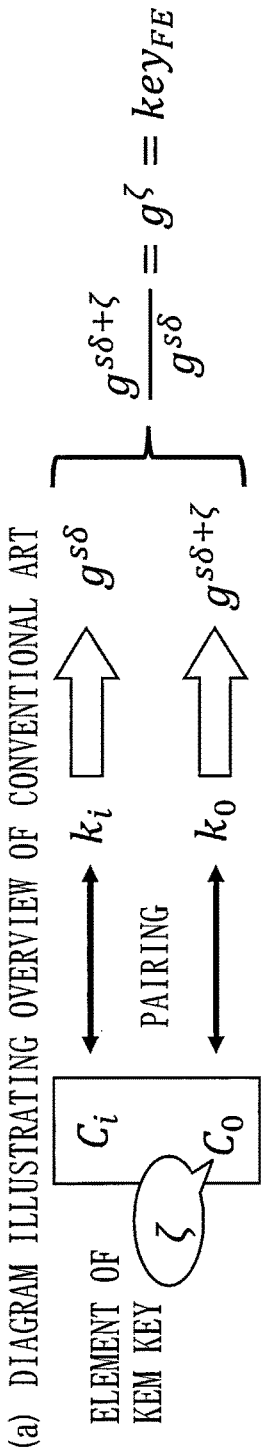
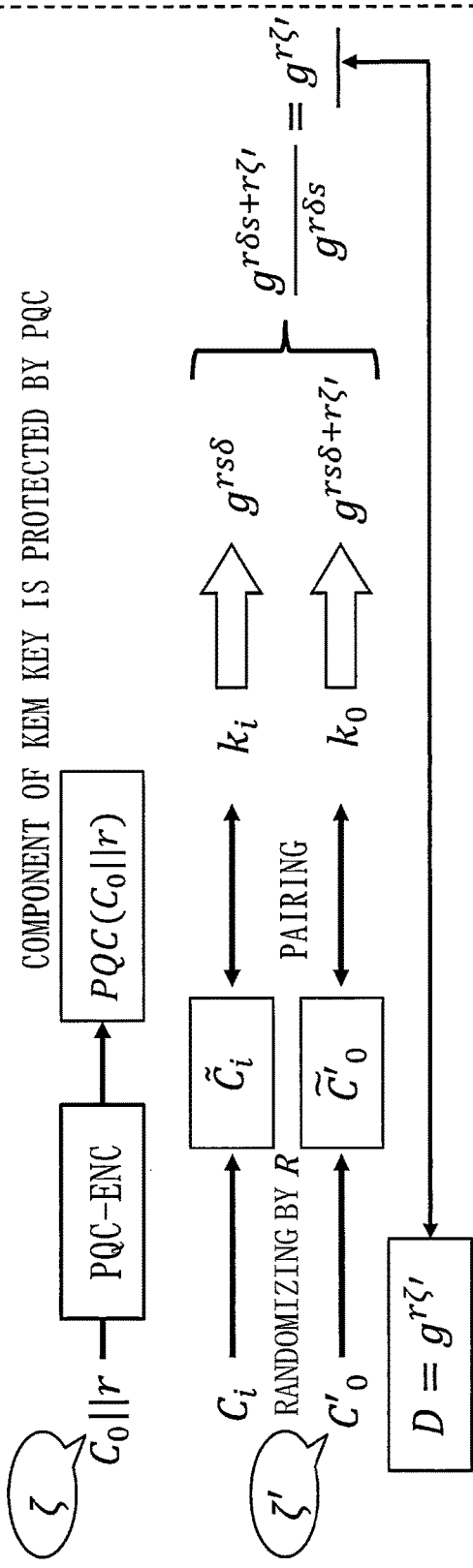

ENCRYPTION APPARATUS, DECRYPTION APPARATUS, DECRYPTION-POSSIBLE VERIFICATION APPARATUS, CRYPTOSYSTEM, ENCRYPTION METHOD, AND COMPUTER READABLE MEDIUM

CROSS REFERENCE TO RELATED APPLICATIONS

This application is a Continuation of PCT International Application No. PCT/JP2022/000537 filed on Jan. 11, 2022, which is hereby expressly incorporated by reference into the present application.

TECHNICAL FIELD

The present disclosure relates to an encryption apparatus, a decryption apparatus, a decryption-possible verification apparatus, a cryptosystem, an encryption method, and an encryption program.

BACKGROUND ART

Attribute based encryption (Attribute Based Encryption, ABE) is a type of public key cryptography. In the attribute based encryption, a decryption-possible condition in which an access right is expressed by a logical expression and the like is input at a time of encryption, and a ciphertext corresponding to the condition is decrypted using a user secret key created based on a set of attributes that satisfy the condition.

Encryption that is resistant to being decoded by a quantum computer is called post quantum cryptography (Post Quantum Cryptography, PQC), and attribute based encryption is being developed that is to become post quantum cryptography.

Non-Patent Literature 1 discloses attribute based encryption that is post quantum cryptography.

CITATION LIST

Non-Patent Literature

Non-Patent Literature 1: Gorbunov, S., et al., "Attribute-Based Encryption for Circuits." Journal of the ACM (JACM) 62.6 (2015), pp. 1-33.

SUMMARY OF INVENTION

Technical Problem

Since the attribute based encryption, the post quantum cryptography that Non-Patent Literature 1 and the like disclose, is often configured based on lattice cryptography technology, there are various issues in terms of function, efficiency, and the like. Specifically, a key policy type, that is, attribute based encryption that sets a decryption-possible condition to a user secret key and sets a set of attributes to a ciphertext often being proposed, checking only the decryption-possible condition cannot be done since correspondence confirmation between the decryption-possible condition and an attribute set is integrated with decryption, a data size of the ciphertext being dependent on a maximum value designated by a master key, that is, the data size of the ciphertext and encryption processing time not being efficient, and the like can be given as issues. Thus, there is an issue of the attribute based encryption, conventional post quantum cryptography, not being able to satisfy both flexibility and efficiency of access control of the attribute based encryption and security against the quantum computer.

The present disclosure aims to provide public key cryptosystem technology having both flexibility and efficiency of access control of attribute based encryption and security against a quantum computer.

Solution to Problem

An encryption apparatus according to the present disclosure includes:

an encryption unit, when a user secret key SKΓ is generated using a secret key MSK of attribute based encryption and a set of attributes Γ corresponding to a decryption-possible condition L,
  to generate a key K and a ciphertext P corresponding to the key K by encrypting the decryption-possible condition L by the attribute based encryption using, as an encryption key of the attribute based encryption, a key PK consisting of a public key MPK corresponding to the secret key MSK and a public key PQCPK of post quantum cryptography, to regard a part of the ciphertext P where the decryption-possible condition L is encrypted based on a secret value as P-D, and to regard a part of the ciphertext P where the secret value that is shared is encrypted as P-SS,
  to generate K' and P'-D by randomizing each of the key K and the P-D using a random number R, and
  to generate a ciphertext C by encrypting data consisting of the P-D and the random number R by the post quantum cryptography using the public key PQCPK, wherein
the P-SS, the P'-D, and the K' are decryption-possible verification parameters corresponding to the user secret key SKΓ.

Advantageous Effects of Invention

According to the present disclosure, by encrypting by attribute based encryption a decryption-possible condition L corresponding to a user secret key SKΓ using a key PK consisting of a public key MPK of the attribute based encryption and a public key PQCPK of post quantum cryptography as an encryption key of the attribute based encryption, a key K and a ciphertext P corresponding to the key K are generated. Here, a part of the ciphertext P where the decryption-possible condition L is encrypted based on a secret value is regarded as P-D and a part of the ciphertext P where the secret value that is shared is encrypted is regarded as P-SS. K' and P'-D are generated by randomizing each of the K and the P-D using a random number R. A ciphertext C is generated by encrypting data consisting of the P-D and the random number R by the post quantum cryptography using the public key PQCPK. The P-SS, the P'-D, and the K' are decryption-possible verification parameters corresponding to the user secret key SKΓ.

Thus, according to the present disclosure, public key cryptosystem technology having both flexibility and efficiency of access control of attribute based encryption and security against a quantum computer can be provided.

BRIEF DESCRIPTION OF DRAWINGS

FIG. 15 is a diagram describing effects of the cryptosystem 100 according to Embodiment 1, (a) is a diagram describing conventional art, and (b) is a diagram describing Embodiment 1.

FIG. 16 is a diagram describing effects of the cryptosystem 100 according to Embodiment 1, (a) is a diagram illustrating an overview of conventional art, and (b) is a diagram illustrating an overview of Embodiment 1.

DESCRIPTION OF EMBODIMENTS

Figure 1:
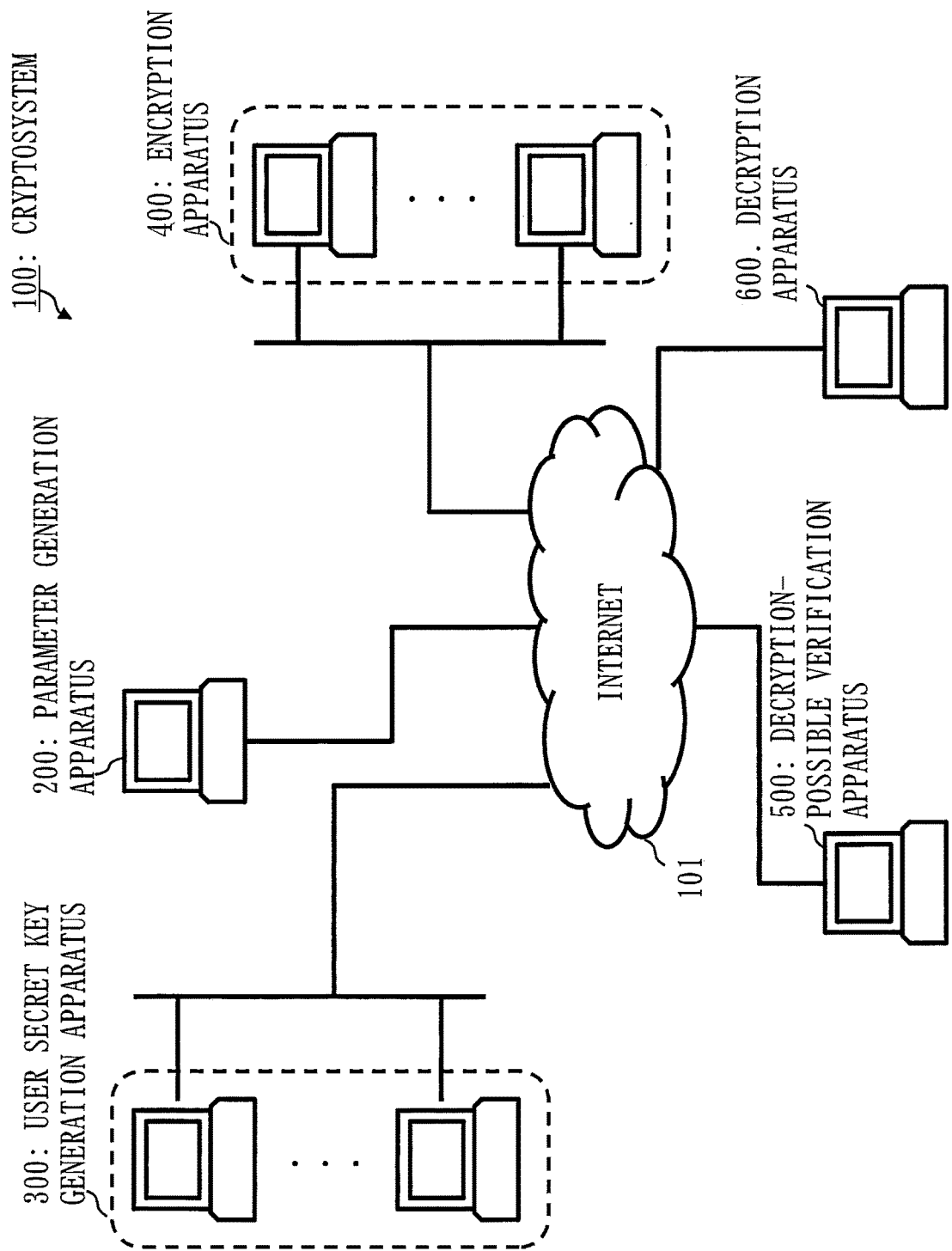
FIG. 1 is a diagram illustrating an example of a configuration of a cryptosystem 100 according to Embodiment 1.

In the description of the embodiment and in the drawings, the same reference signs are added to the same elements and corresponding elements. Descriptions of elements having the same reference signs added will be suitably omitted or simplified. Arrows in the diagrams mainly indicate flows of data, input and output of signals, or flows of processes. "Unit" may be suitably replaced with "circuit", "apparatus", "equipment", "step", "procedure", "process", or "circuitry". Functions of each unit may be implemented by any of firmware, software, hardware, or a combination of these.

Embodiment 1

The present embodiment will be described in detail below by referring to the drawings.
*Description of Configuration*
FIG. 1 is a block diagram illustrating an example of a configuration of a cryptosystem 100 according to the present embodiment. As illustrated in FIG. 1, the cryptosystem 100 includes a parameter generation apparatus 200, a plurality of user secret key generation apparatuses 300, a plurality of encryption apparatuses 400, a decryption-possible verification apparatus 500, and a decryption apparatus 600. The cryptosystem 100 is also called a "post quantum attribute based cryptosystem". Each apparatus that configures the cryptosystem 100 is suitably connected communicatively through Internet 101. Each apparatus that configures the cryptosystem 100 may be suitably configured integrally.

The cryptosystem 100 provides public key cryptosystem technology that is resistant to being decoded by a quantum computer and having a property that is capable of access control as with attribute based encryption.

Figure 2:
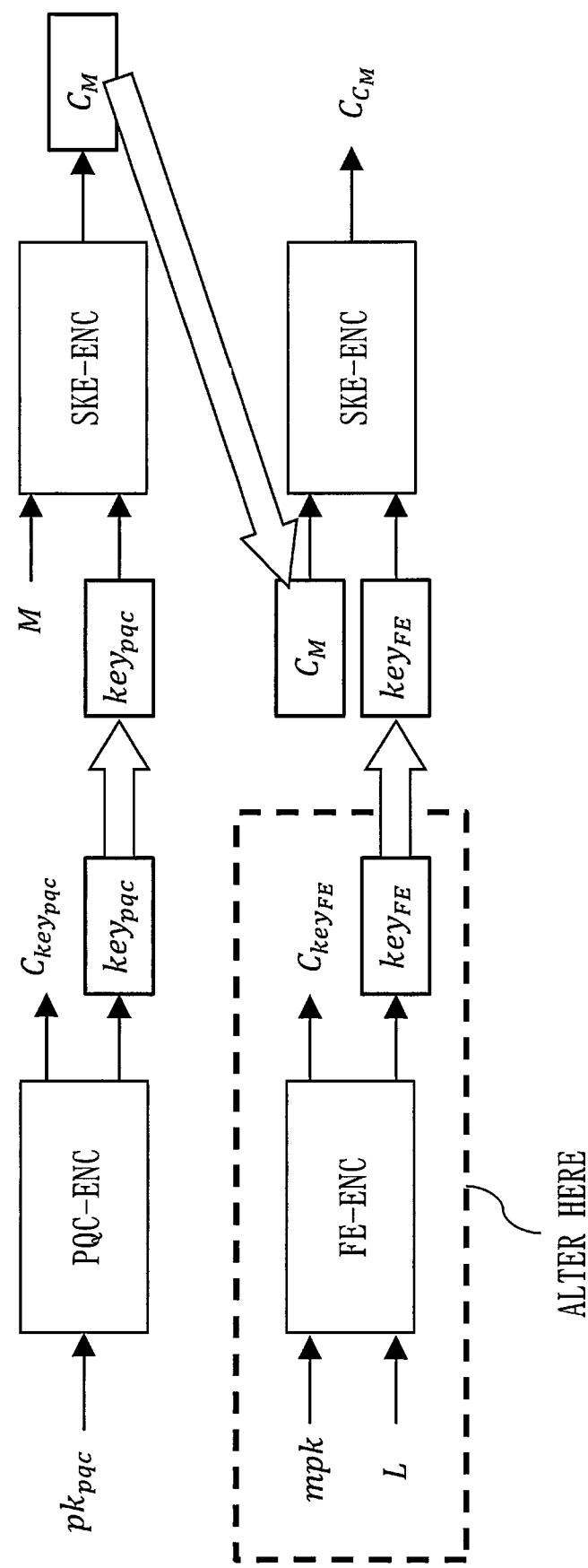
FIG. 2 is a diagram describing an overview of a process of the cryptosystem 100 according to Embodiment 1.

FIG. 2 illustrates an overview of a process of the cryptosystem 100. As illustrated in FIG. 2, in the cryptosystem 100, double encryption is carried out by carrying out encryption by functional encryption (Functional encryption, FE) after carrying out encryption by post quantum cryptography.

By a method to naively carry out double encryption, however, there is an advantage where there is no concern of a cleartext leaking since the cleartext is encrypted by the post quantum cryptography even when the functional encryption is decoded by the quantum computer. By the method, however, there is an issue of a key of the post quantum cryptography that is common to everyone is necessary to be distributed in addition to a key of the functional encryption, and an issue of an encryption key $key_{FE}$ generated by the functional encryption is completely exposed to an attacker who possess a quantum computer.

Therefore, in the present embodiment, a process to carry out encryption by the functional encryption will be altered for the purpose of making the $key_{FE}$ not being able to be decoded even by an attacker who possesses a quantum computer, and making a decryption-possible condition being able to be checked even without using a secret key of the PQC (Post Quantum Cryptography).

Figure 3:
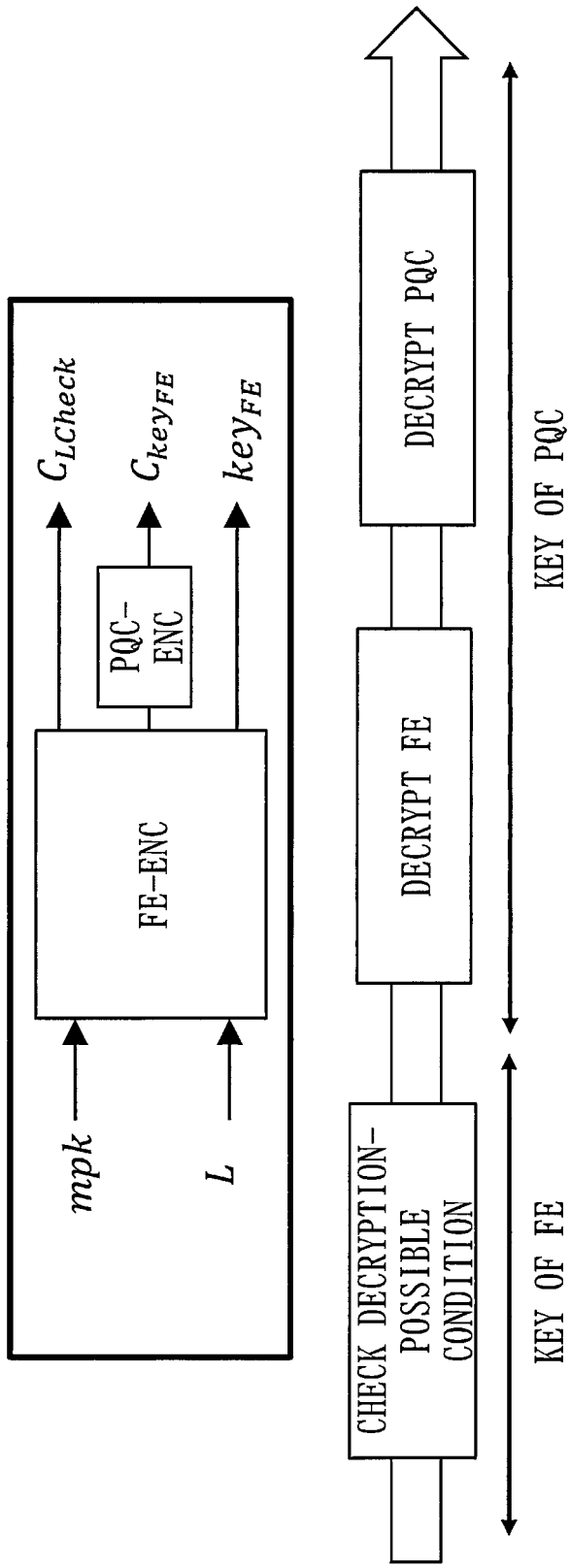
FIG. 3 is a diagram describing an overview of a process of the cryptosystem 100 according to Embodiment 1.

FIG. 3 is a diagram describing alteration in the process to carry out the encryption by the functional encryption. As illustrated in FIG. 3, in a process to check a decryption-possible condition of the FE, the process to carry out the encryption by the functional encryption will be changed in a way that the FE does not have to be decrypted, that is, the key of the PQC does not have to be used. A dedicated parameter will be prepared for the above.

The process to carry out the encryption by the functional encryption will be changed in a way that the FE cannot be decrypted even by an attacker who possess a quantum computer by carrying out again encryption of a parameter for decrypting the FE by the PQC.

The Internet 101 is a communication channel to suitably connect the parameter generation apparatus 200, the plurality of user secret key generation apparatuses 300, the plurality of encryption apparatuses 400, the decryption-possible verification apparatus 500, and the decryption apparatus 600. The Internet 101 is an example of a network. Other types of networks such as a LAN (Local Area Network) and the like installed in a same facility may be used instead of the Internet 101.

The parameter generation apparatus 200 is a computer that generates a common parameter, and suitably transmits the common parameter that is generated to each of each user secret key generation apparatus 300, each encryption apparatus 400, the decryption-possible verification apparatus 500, and the decryption apparatus 600 through the Internet 101. The computer, as a specific example, is a PC (Personal Computer). The common parameter is a parameter that is commonly used in the cryptosystem 100, and as a specific example, is a key. The common parameter that is generated may be transmitted directly by mailing and the like a storage medium on which the common parameter is recorded without being transmitted through the Internet 101.

Each user secret key generation apparatus 300 generates a user secret key, and is a computer that transmits the user secret key that is generated to the decryption-possible verification apparatus 500 and the decryption apparatus 600.

The encryption apparatus 400 is a computer that functions as an apparatus that encrypts data. The encryption apparatus 400 receives a public key from the parameter generation apparatus 200, and with a decryption-possible condition L as input, outputs a verification parameter CCHECK, a ciphertext C, and a common-key-secret-key KEY.

The decryption-possible verification apparatus 500 is a computer that verifies whether or not the ciphertext C is possible to be decrypted by the user secret key. The decryption-possible verification apparatus 500 receives the public key from the parameter generation apparatus 200, receives the verification parameter CCHECK and the ciphertext C from the encryption apparatus 400, and with the user secret key as input, verifies whether or not the ciphertext C is possible to be decrypted by the user secret key that is inputted. After that, as a specific example, the decryption-possible verification apparatus 500 outputs 0 in a case where the ciphertext C is possible to be decrypted by the user secret key and outputs 1 in other cases.

The decryption apparatus 600 is a computer that receives the verification parameter CCHECK and the ciphertext C from the encryption apparatus 400, receives the user secret key from the user secret key generation apparatus 300, and that outputs a result of decrypting the ciphertext C.

In the following, an example of a configuration of each apparatus that configures the cryptosystem 100 will be described.

Figure 4:
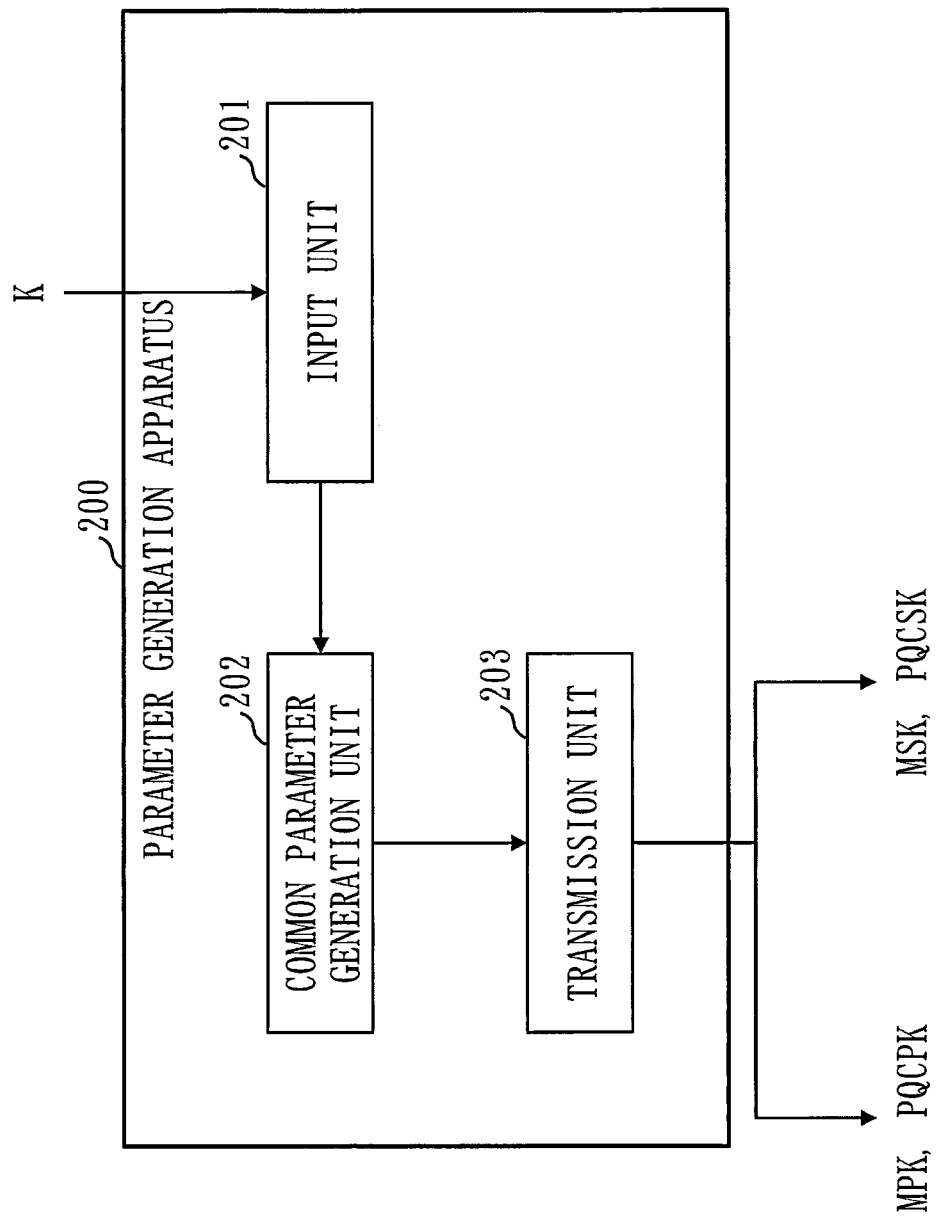
FIG. 4 is a diagram illustrating an example of a configuration of a parameter generation apparatus 200 according to Embodiment 1.

FIG. 4 is a block diagram illustrating an example of a configuration of the parameter generation apparatus 200. As illustrated in FIG. 4, the parameter generation apparatus 200 includes an input unit 201, a common parameter generation unit 202, and a transmission unit 203. Although not illustrated, the parameter generation apparatus 200 includes a recording medium that stores data used in each unit of the parameter generation apparatus 200.

The input unit 201 accepts a bit length K of the key used in the cryptosystem 100 as input.

The common parameter generation unit 202 generates a public key MPK and a master secret key MSK, and after that, generates a public key PQCPK and a secret key PQCSK. Each of the public key MPK and the master secret key MSK is a key of the attribute based encryption that is to be a basis for computation used in the cryptosystem 100. The master secret key MSK is also called a secret key of the attribute based encryption, and the public key MPK is also called an attribute based public key. The MPK corresponds to the MSK. Each of the public key PQCPK and the secret key PQCSK is a key of the post quantum cryptography. The public key PQCPK is also called a public key of the post quantum cryptography, and the secret key PQCSK is also called a secret key of the post quantum cryptography. The PQCSK corresponds to the PQCPK. Although not illustrated, the common parameter generation unit 202 may include a random number generation function and the like to generate each of the MPK, the MSK, the PQCPK, and the PQCSK.

The transmission unit 203 transmits the public key MPK and the public key PQCPK that the common parameter generation unit 202 generated to each of the user secret key generation apparatus 300, the encryption apparatus 400, the decryption-possible verification apparatus 500, and the decryption apparatus 600. The transmission unit 203 transmits the master secret key MSK and the post quantum cryptography secret key PQCSK that the common parameter generation unit 202 generated to each user secret key generation apparatus 300.

Figure 5:
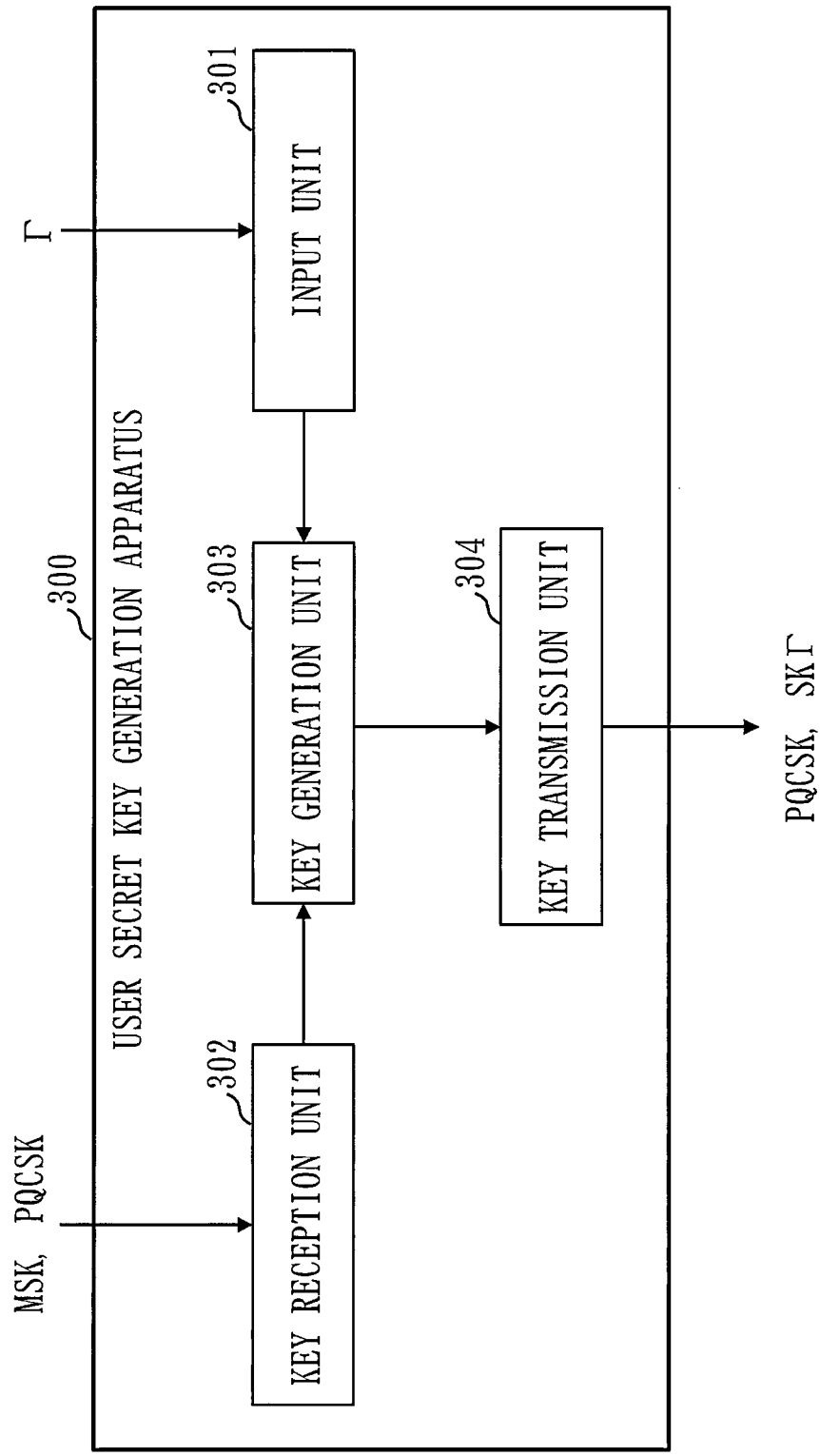
FIG. 5 is a diagram illustrating an example of a configuration of a user secret key generation apparatus 300 according to Embodiment 1.

FIG. 5 is a block diagram illustrating an example of a configuration of the user secret key generation apparatus 300. As illustrated in FIG. 5, the user secret key generation apparatus 300 includes an input unit 301, a key reception unit 302, a key generation unit 303, and a key transmission unit 304. Although not illustrated, the user secret key generation apparatus 300 includes a recording medium that stores data used in each unit of the user secret key generation apparatus 300.

The input unit 301 accepts a set of attributes $\Gamma$ as input. The $\Gamma$ is a parameter and corresponds to the decryption-possible condition L.

The key reception unit 302 receives the MSK and the PQCSK.

The key generation unit 303 generates a user secret key SK$\Gamma$ using the MSK and the $\Gamma$. The user secret key SK$\Gamma$ is also called an attribute based encryption user secret key. Although not illustrated, the key generation unit 303 may include a random number generation function and the like to generate the SK$\Gamma$.

The key transmission unit 304 transmits each of the PQCSK that the key reception unit 302 received and the SK$\Gamma$ that the key generation unit 303 generated to the decryption apparatus 600.

Figure 6:
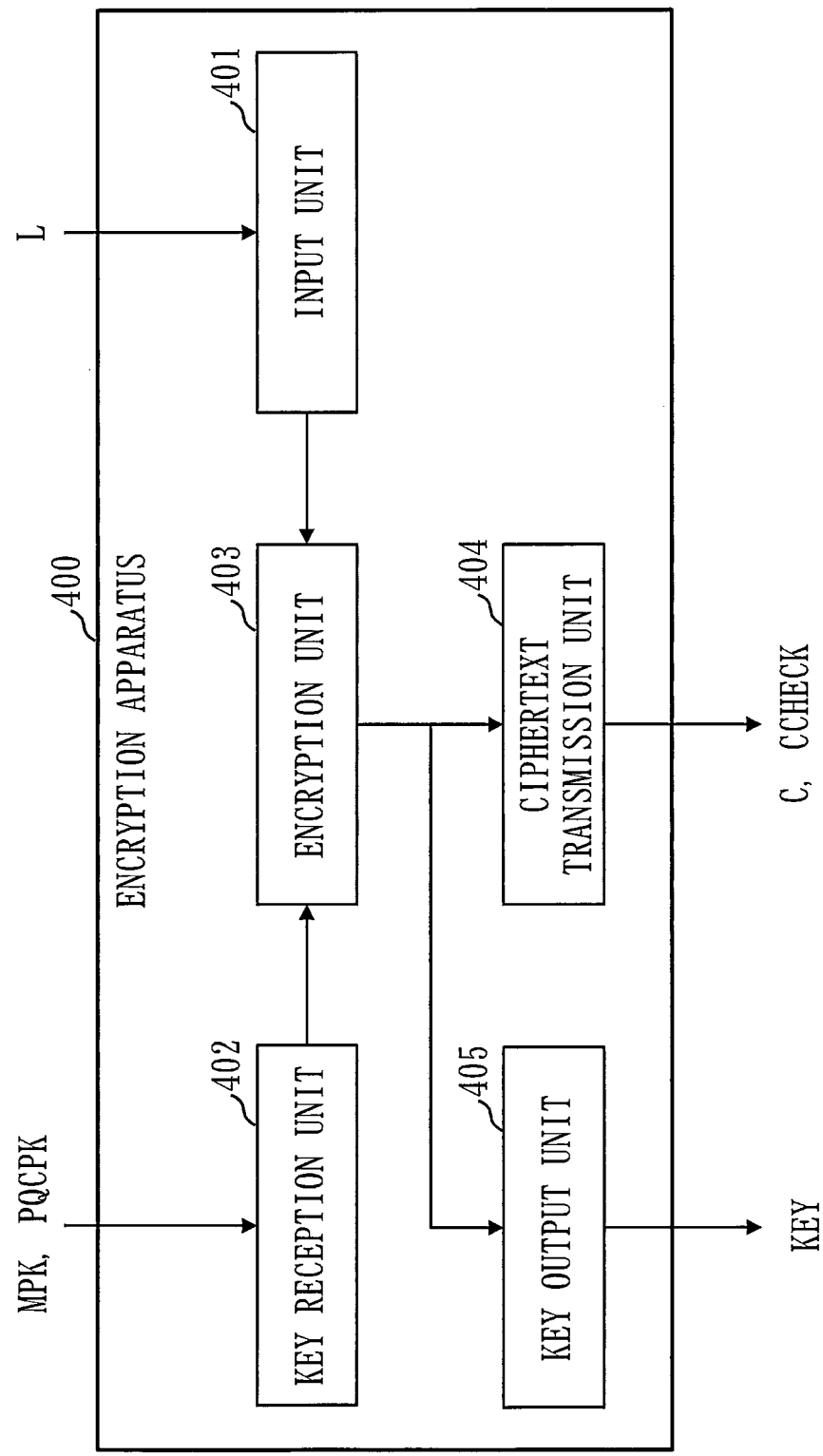
FIG. 6 is a diagram illustrating an example of a configuration of an encryption apparatus 400 according to Embodiment 1.

FIG. 6 is a block diagram illustrating an example of a configuration of the encryption apparatus 400. As illustrated in FIG. 6, the encryption apparatus 400 includes an input unit 401, a key reception unit 402, an encryption unit 403, a ciphertext transmission unit 404, and a key output unit 405. Although not illustrated, the encryption apparatus 400 includes a recording medium that stores data used in each unit of the encryption apparatus 400.

The input unit 401 accepts the decryption-possible condition L as input.

The key reception unit 402 receives the MPK and the PQCPK.

The encryption unit 403 generates the verification parameter CCHECK, the ciphertext C, and the common-key-secret-key KEY using the L, the MPK, and the PQCPK. The verification parameter CCHECK is also called a decryption-possible verification parameter. Specifically, first, the encryption unit 403 generates a key K and a ciphertext P corresponding to the key K by encrypting the L by the attribute based encryption using a key PK as an encryption key of the attribute based encryption. Here, the PK consists of the MPK and the PQCPK. A part of the ciphertext P where the L is encrypted based on a secret value is regarded as P-D and a part of the ciphertext P where the secret value that is shared is encrypted is regarded as P-SS. The secret value that is shared is also called a secret sharing value. After that, the encryption unit 403 generates K' and P'-D by randomizing each of the key K and the P-D using a random number R, and generates the ciphertext C by encrypting data consisting of the P-D and the random number R by the post quantum cryptography using the PQCPK. Here, the P-SS, the P'-D, and the K' are decryption-possible verification parameters corresponding to the SK$\Gamma$. Although not illustrated, in the encryption unit 403, a random number generation function may be included to generate each of the verification parameter CCHECK and the ciphertext C.

The ciphertext transmission unit 404 transmits each of the CCHECK and the C that the encryption unit 403 generated to each of the decryption-possible verification apparatus 500 and the decryption apparatus 600.

The key output unit 405 outputs the KEY.

Figure 7:
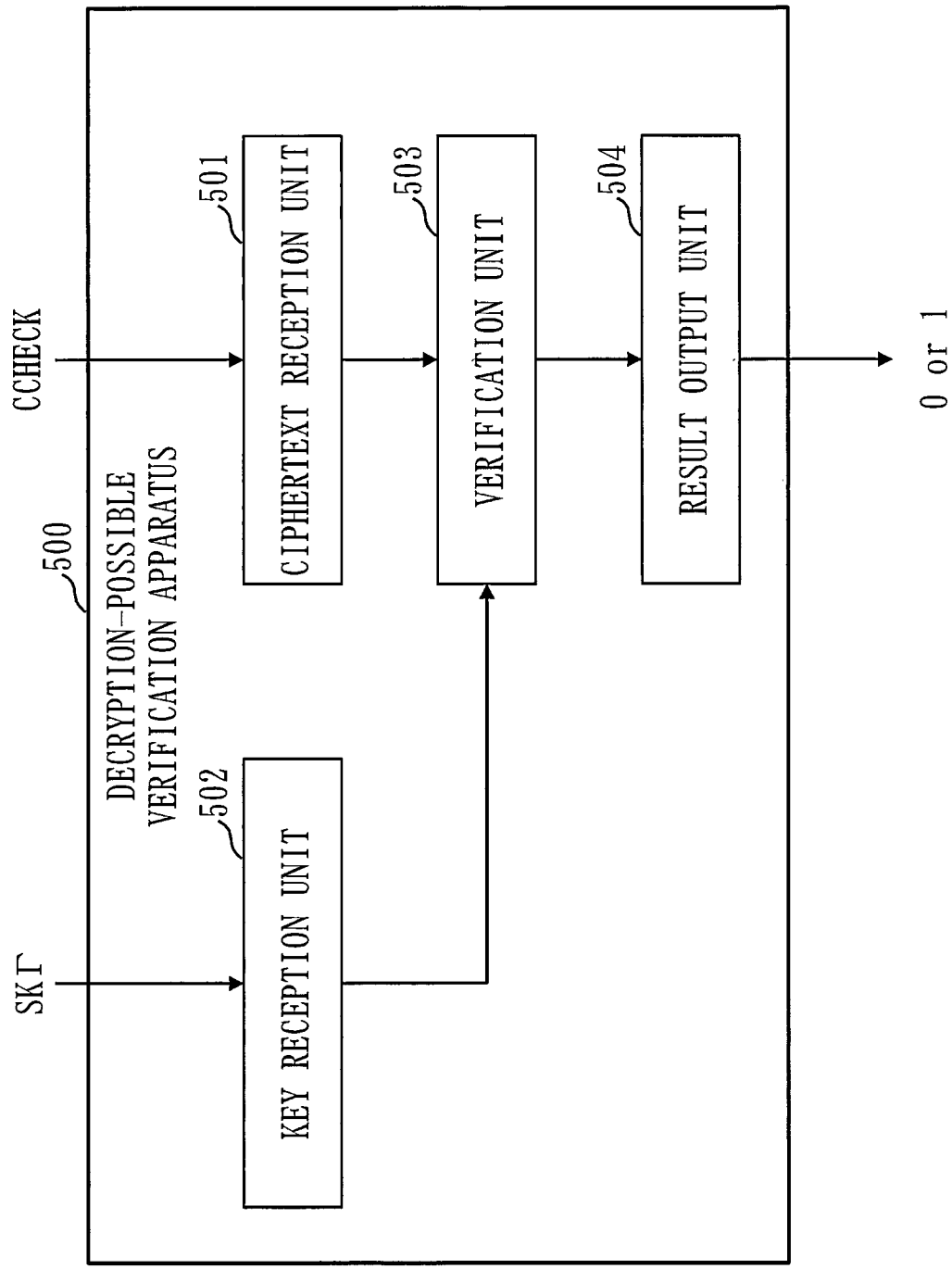
FIG. 7 is a diagram illustrating an example of a configuration of a decryption-possible verification apparatus 500 according to Embodiment 1.

FIG. 7 is a block diagram illustrating an example of a configuration of the decryption-possible verification apparatus 500. As illustrated in FIG. 7, the decryption-possible verification apparatus 500 includes a ciphertext reception unit 501, a key reception unit 502, a verification unit 503, and a result output unit 504.

The ciphertext reception unit 501 receives each of the CCHECK (=P-SS, P'-D, K') and the C from the encryption apparatus 400.

The key reception unit 502 receives the SKΓ from the user secret key generation apparatus 300.

The verification unit 503 executes a verification process. Specifically, the verification unit 503 decrypts the decryption-possible verification parameter by the attribute based encryption using the SKΓ, and in a case where the K' and a result of decrypting match, determines that the SKΓ is possible to be decrypted.

The result output unit 504, as a specific example, outputs 0 or 1 as a value that indicates a verification result.

Figure 8:
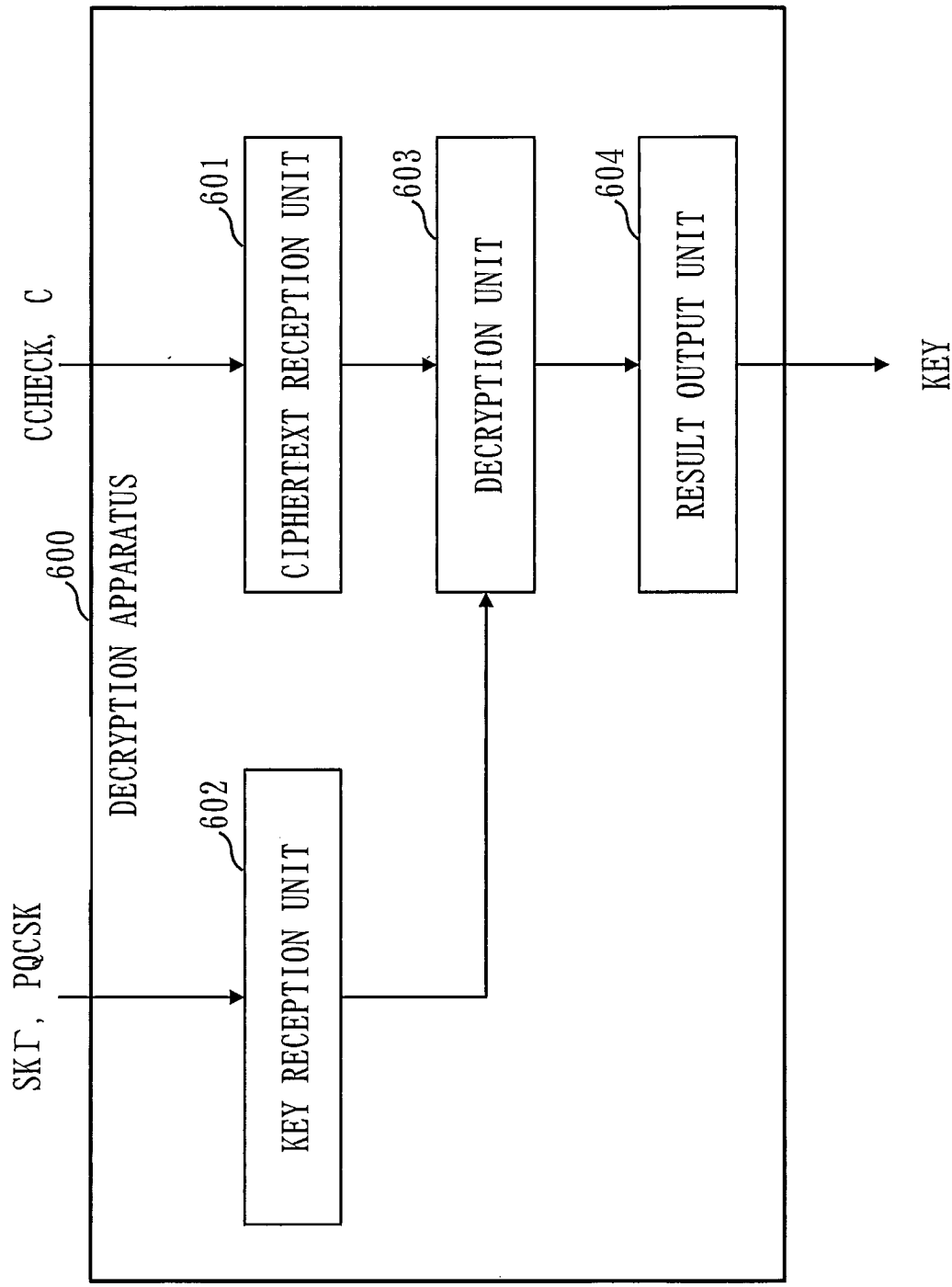
FIG. 8 is a diagram illustrating an example of a configuration of a decryption apparatus 600 according to Embodiment 1.

FIG. 8 is a block diagram illustrating an example of a configuration of the decryption apparatus 600. As illustrated in FIG. 8, the decryption apparatus 600 includes a ciphertext reception unit 601, a key reception unit 602, a decryption unit 603, and a result output unit 604.

The ciphertext reception unit 601 receives each of the CCHECK (=P-SS, P'-D, K') and the C from the encryption apparatus 400.

The key reception unit 602 receives each of the SKΓ and the PQCSK from the user secret key generation apparatus 300.

The decryption unit 603 calculates a common-key-secret-key KEY that is decrypted by executing a decryption process. Specifically, the decryption unit 603 decrypts the ciphertext C by the post quantum cryptography using the PQCSK, calculates P-D based on the P'-D using the random number R, and in a case where P-D that a result of decrypting indicates and the P-D that is calculated match, decrypts data consisting of the P-SS and the P-D by the attribute based encryption using the SKΓ.

The result output unit 604 outputs the common-key-secret-key KEY.

Figure 9:
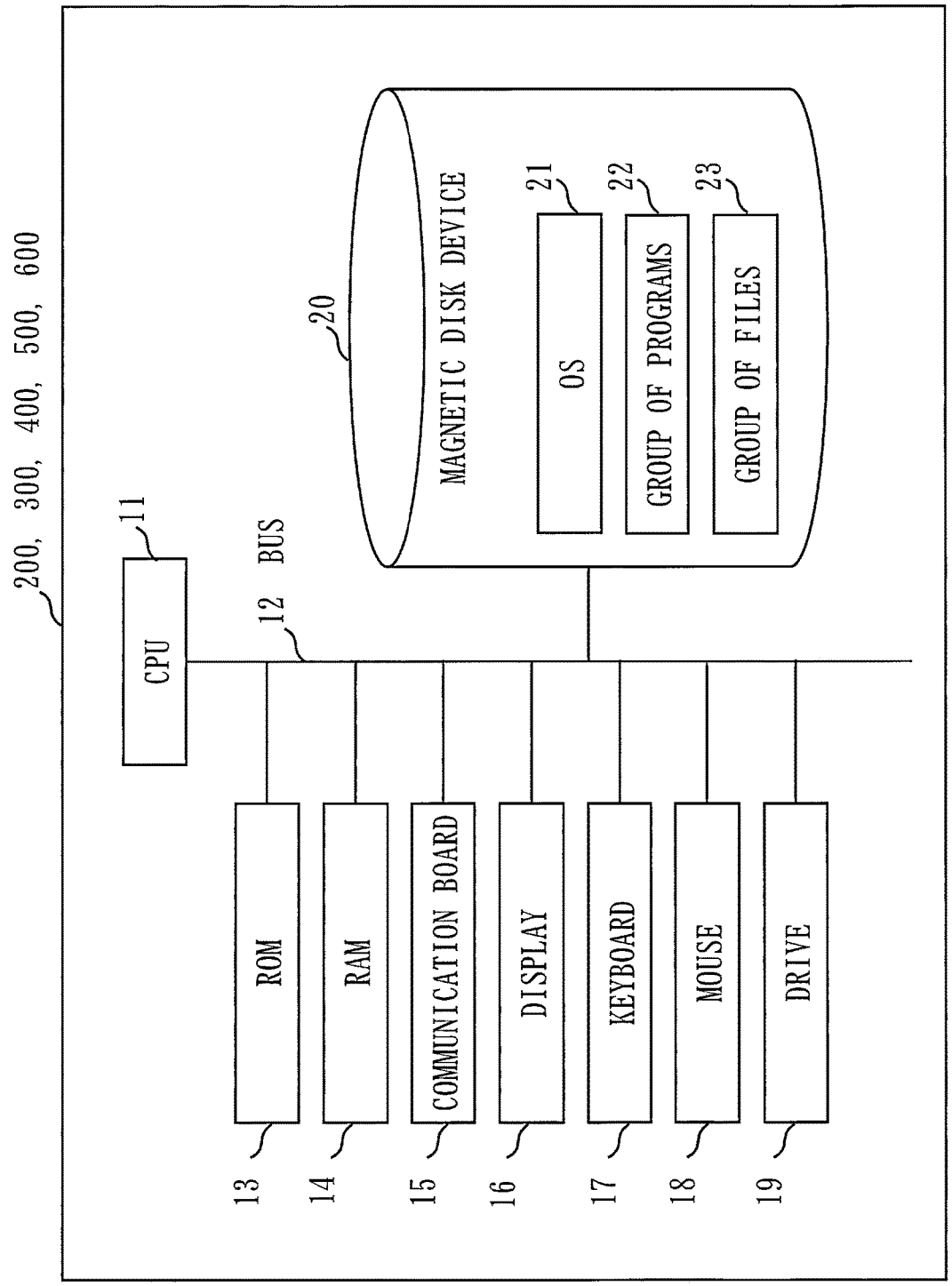
FIG. 9 is a diagram illustrating an example of a hardware configuration of each apparatus according to Embodiment 1.

FIG. 9 is a diagram illustrating an example of hardware resources of each of the parameter generation apparatus 200, each user secret key generation apparatus 300, each encryption apparatus 400, the decryption-possible verification apparatus 500, and the decryption apparatus 600. As illustrated in FIG. 9, each apparatus is a computer. Each apparatus may consist of a plurality of computers.

The computer includes a CPU 11 (Central Processing Unit). The CPU 11 is a specific example of a processor. The computer may include a plurality of CPUs 11. The CPU 11 is connected to hardware devices such as a ROM (Read Only Memory) 13, a RAM (Random Access Memory) 14, a communication board 15, a display 16, a keyboard 17, a mouse 18, a drive 19, a magnetic disk device 20, and the like through a bus 12, and controls these hardware devices. The display 16 is a display device. The drive 19 is a device that reads data from a storage medium such as an FD (Flexible Disk Drive), a CD (Compact Disc), a DVD (Digital Versatile Disc), or the like and that writes data into the storage medium.

The ROM 13, the RAM 14, the magnetic disk device 20, and the drive 19 are examples of a storage device. The keyboard 17, the mouse 18, and the communication board 15 are examples of an input device. The display 16 and the communication board 15 are examples of an output device.

The communication board 15 is connected to a communication network such as a LAN, Internet, a telephone line, or the like by wire or wirelessly.

An OS (Operating System) 21, a group of programs 22, and a group of files 23 are stored on the magnetic disk device 20.

A program that executes a function described as "unit" in the present embodiment is included in the group of programs 22. Each program is read and executed by the CPU 11. That is, the program is what makes the computer function as the "unit", and is what makes the computer execute a procedure or a method of the "unit". Each program may be recorded in a computer-readable non-volatile recording medium. The non-volatile recording medium, as a specific example, is an optical disc or a flash memory. Each program may be provided as a program product.

Various types of data (input, output, a determination result, a calculation result, a process result, or the like) used in the "unit" described in the present embodiment is included in the group of files 23.

Processes of the present embodiment described based on flowcharts and the like are executed using at least any piece of hardware such as the CPU 11, the storage device, the input device, the output device, and the like.

*Description of Operation*

An operation procedure of each apparatus of the cryptosystem 100 is equivalent to a method having a name of each apparatus. A program that enables operation of each apparatus of the cryptosystem 100 is equivalent to a program having the name of each apparatus. As a specific example, an operation procedure of the encryption apparatus 400 is equivalent to an encryption method, and a program that enables operation of the encryption apparatus 400 is equivalent to an encryption program.

Basic encryption technology used in the present embodiment and notation in the technology will be described before describing operation of the cryptosystem 100.

Ciphertext policy type attribute based encryption is encryption that only a user that possess a user secret key generated from such a set of attributes Γ that satisfies a decryption condition set in the decryption-possible condition L is possible to decrypt. The ciphertext policy type attribute based encryption is configured of an algorithm such as below.

A setup ABESETUP outputs the master secret key MSK and the public key MPK with a key length and the like as input.

User secret key generation of attribute based encryption ABEKEYGEN generates the user secret key SKΓ for a user that applies to the Γ with the MSK and the set of attributes Γ as input.

Encryption ABEENC generates a key K for common key encryption and the ciphertext P corresponding to the key K with the public key MPK and the decryption-possible condition L as input.

Decryption ABEDEC, with the user secret key SKΓ and the ciphertext P as input, a key K that the P is encrypting is outputted in a case where the Γ and the decryption-possible condition L of when the P is generated matched.

Reference 1

Okamoto, T., et al., "Fully Secure Functional Encryption with General Relations from the Decisional Linear Assumption", Annual Cryptology Conference. Springer, Berlin, Heidelberg, 2010.

Reference 1 and the like disclose a method to use secret sharing calculation as a method to encode the decryption-possible condition L on the ciphertext P. The method to use the secret sharing calculation is a method to carry out secret sharing according to a logical expression in which a secret value S necessary for decrypting is described as the decryption-possible condition L. As a specific example, a case where decryption will be set in a way that will be successful only by a user secret key that has A AND B, that is, attributes of both the A and the B, will be considered. In this case, first, a ciphertext is generated by encrypting a cleartext using a value that can calculate an encryption target by the S or based on the S. Next, regard the S as S=S1+S2, and embed the S1 in the A and embed the S2 in the B. Next, extract the S1 using the user secret key in which the A is embedded, extract the S2 using the user secret key in which the B is embedded, and as a result, the ciphertext is decrypted by carrying out final calculation by restoring the S, or a value that can be calculated based on the S. Reference 1 proposes efficient attribute based encryption, but it is known that the attribute based encryption is not resistant to being decoded by the quantum computer.

Here, in the ciphertext P, a part where the secret sharing value is encrypted is described as the P-SS, and a part where the encryption target that is encrypted using the secret value S, or a value that can be calculated based on the S will be described as the P-D. Of the decryption ABEDEC, a part where the secret sharing value to be restored is described as secret sharing restoration computation ABEDEC-SS, and a part where final decryption is to be performed is described as final decryption computation ABEDEC-D.

Post quantum public key cryptography (PQC) is configured of an algorithm such as below.

Post quantum cryptography key generation PQCKG outputs the secret key PQCSK and the public key PQCPK with a key length and the like as input.

Post quantum cryptography encryption PQCENC outputs a ciphertext PQCC with the PQCPK and a cleartext M as input.

Post quantum cryptography decryption PQCDEC outputs a decryption result with the PQCSK and the ciphertext PQCC as input.

In the following, the operation of the cryptosystem 100 that is equivalent to a calculation method of each apparatus according to the present embodiment will be described.

Figure 10:
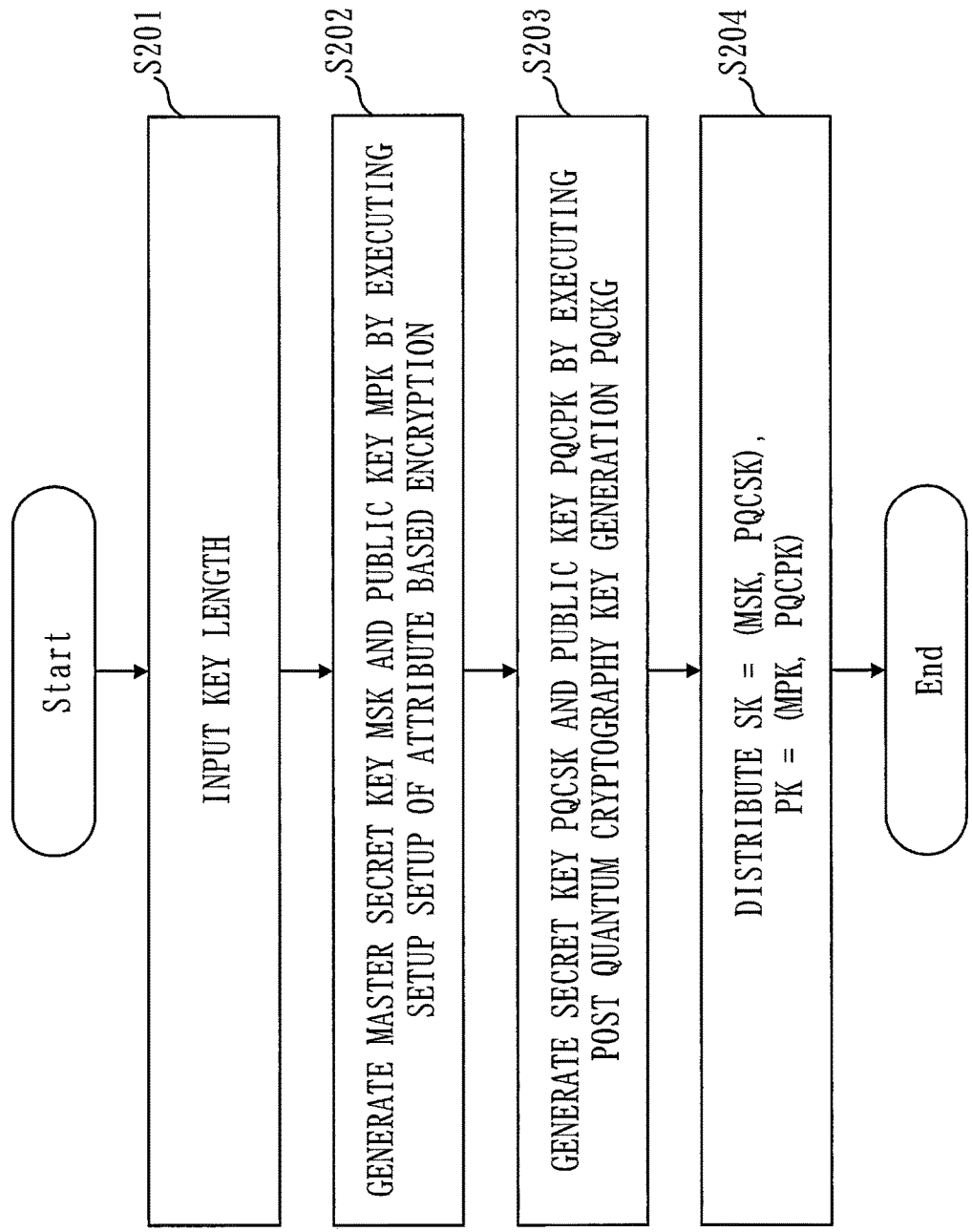
FIG. 10 is a flowchart illustrating operation of the parameter generation apparatus 200 according to Embodiment 1.

FIG. 10 is a flowchart representing an example of a parameter generation process by the parameter generation apparatus 200. The parameter generation process will be described by referring to FIG. 10.

(Step S201: Information Input Step)

The input unit 201 accepts the bit length K of the key as input.

(Step S202: Attribute Based Encryption Key Generation Step)

The common parameter generation unit 202 generates each of the MSK and the MPK by executing setup of the attribute based encryption using the bit length K.

(Step S203: Post Quantum Cryptography Key Generation Step)

The common parameter generation unit 202 generates each of the PQCSK and the PQCPK by executing the PQCKG.

(Step S204: Distribution Step)

The transmission unit 203 transmits each of SK=(MSK, PQCSK) and PK=(MPK, PQCPK) to each apparatus.

Figure 11:
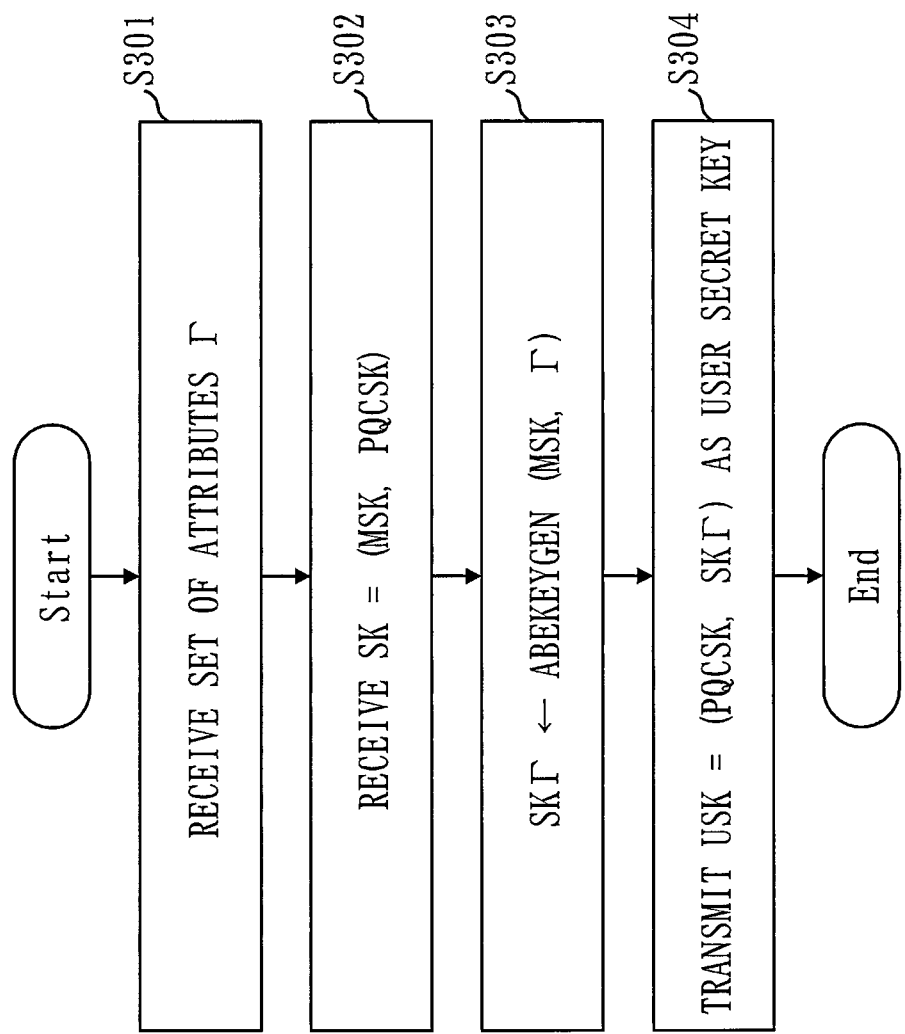
FIG. 11 is a flowchart illustrating operation of the user secret key generation apparatus 300 according to Embodiment 1.

FIG. 11 is a flowchart representing an example of a user secret key generation process by the user secret key generation apparatus 300. The user secret key generation process will be described by referring to FIG. 11.

(Step S301: Attribute Input Step)

The input unit 301 accepts the set of attributes Γ as input.

(Step S302: Key Input Step)

The key reception unit 302 accepts SK=(MSK, PQCSK).

(Step S303: User Secret Key Generation Step)

The key generation unit 303 generates the SKΓ by executing the ABEKEYGEN using the MSK and the Γ.

(Step S304: Transmission Step)

The key transmission unit 304, with the PQCSK and the SKΓ as user secret key USK=(PQCSK, SKΓ), transmits the USK to each apparatus.

Figure 12:
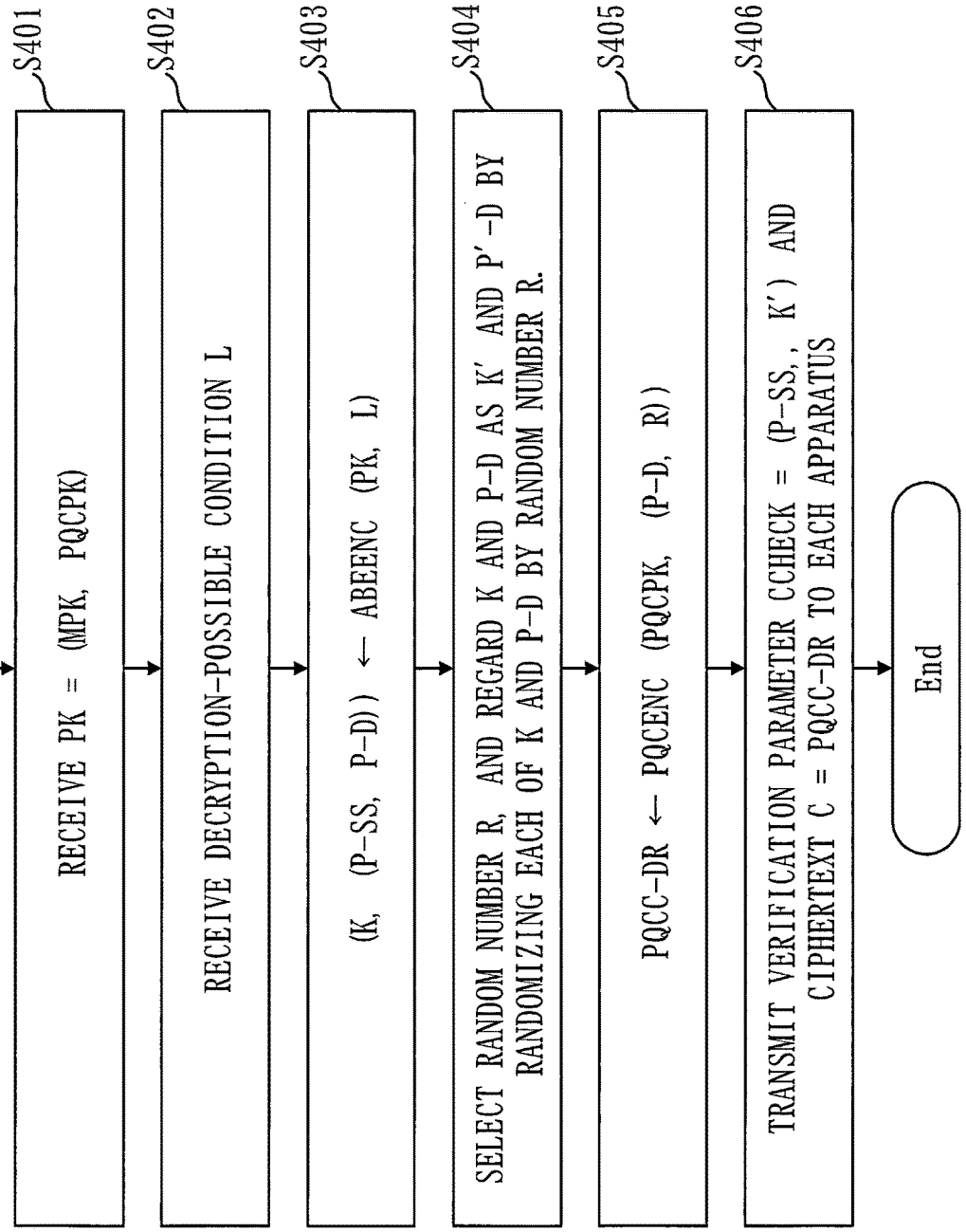
FIG. 12 is a flowchart illustrating operation of the encryption apparatus 400 according to Embodiment 1.

FIG. 12 is a flowchart representing an example of an encryption process by the encryption apparatus 400. The encryption process will be described by referring to FIG. 12.

(Step S401: Attribute Input Step)

The key reception unit 402 receives PK=(MPK, PQCPK).

(Step S402: Decryption-Possible Condition Input Step)

The input unit 401 accepts the decryption-possible condition L.

(Step S403: Attribute Based Encryption Step)

The encryption unit 403 generates P=(P-SS, P-D) and the K by executing the ABEENC using the PK and the L.

(Step S404: Randomization Step)

The encryption unit 403 generates the K' and the P'-D by randomizing each of the K and the P-D using the random number R. Here, assume that the K' is generated by correctly decrypting P'=(P-SS, P'-D). The process of the present step is executable by technology that Reference 1 discloses.

(Step S405: Post Quantum Encryption Step)

The encryption unit 403 generates ciphertext C=PQCC-DR by inputting the PQCPK and cleartext M=(P-D, R) to the PQCENC.

(Step S406: Transmission Step)

The ciphertext transmission unit 404 transmits verification parameter CCHECK=(P-SS, K') and ciphertext C=PQCC-DR to each apparatus.

Figure 13:
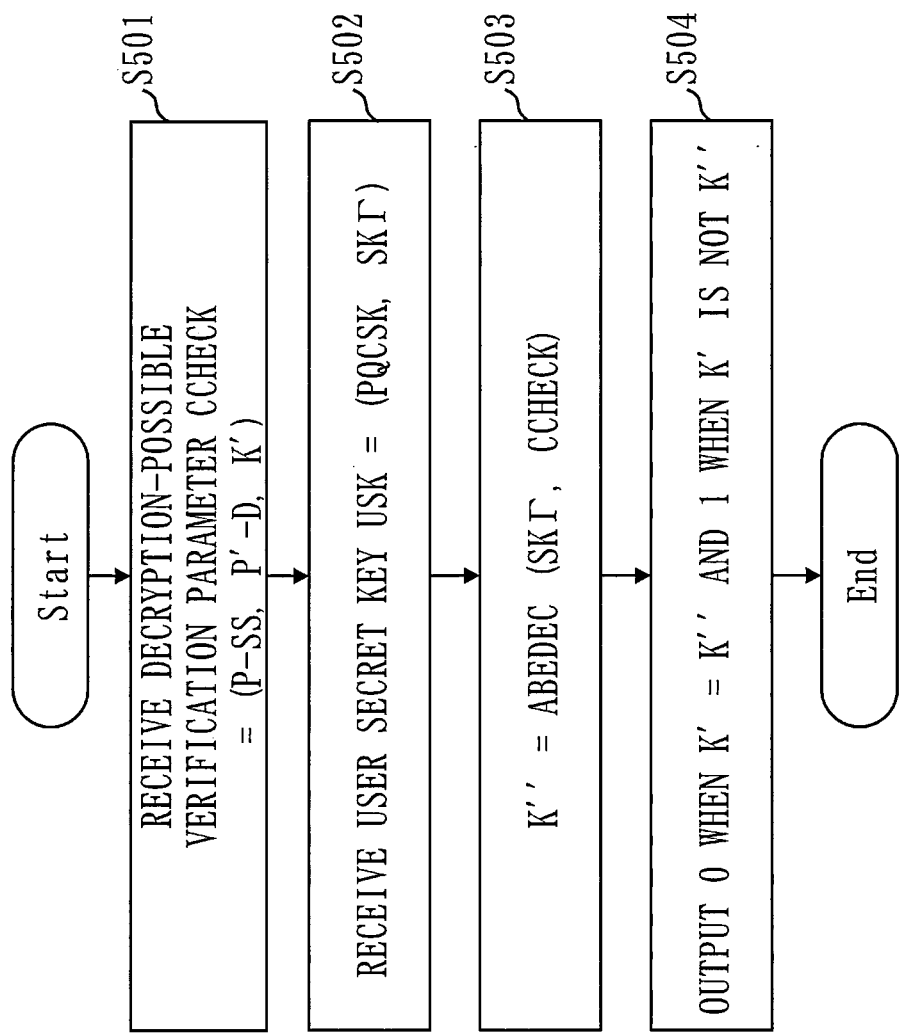
FIG. 13 is a flowchart illustrating operation of the decryption-possible verification apparatus 500 according to Embodiment 1.

FIG. 13 is a flowchart representing an example of a decryption-possible verification process by the decryption-possible verification apparatus 500. The decryption-possible verification process will be described by referring to FIG. 13.

(Step S501: Ciphertext Reception Step)

The ciphertext reception unit 501 receives verification parameter CCHECK=(P-SS, P'-D, K').

(Step S502: Key Reception Step)

The key reception unit 502 receives user secret key USK=(PQCSK, SKΓ).

(Step S503: Verification Step)

The verification unit 503 obtains a decryption result K" by executing the ABEDEC with, as input, the SKΓ, and the (P-SS, P'-D) as a ciphertext of the attribute based encryption.

(Step S504: Output Step)

The result output unit 504 outputs 0 in a case where the K" and the K' match, and outputs 1 in other cases.

Figure 14:
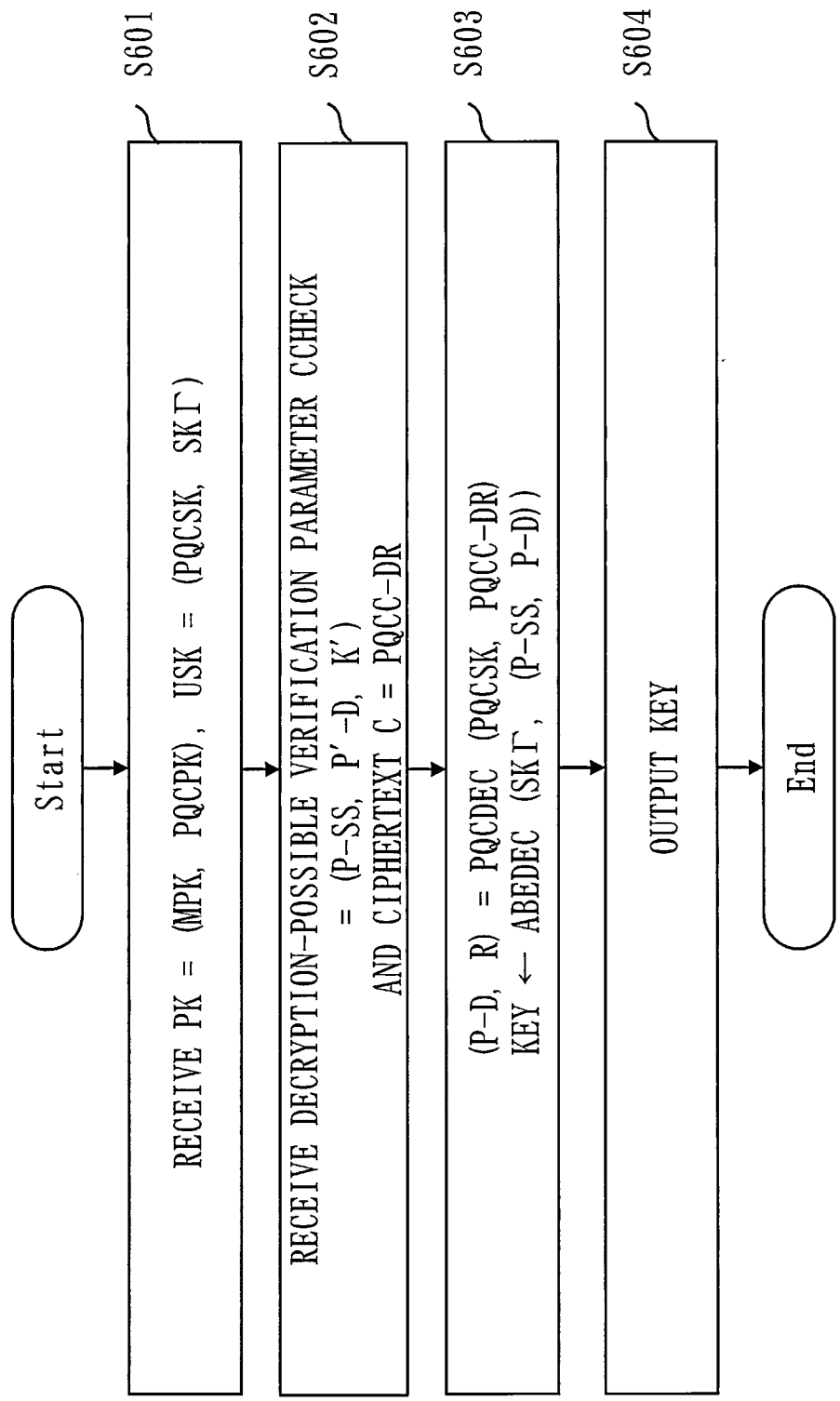
FIG. 14 is a flowchart illustrating operation of the decryption apparatus 600 according to Embodiment 1.

FIG. 14 is a flowchart representing an example of a decryption process by the decryption apparatus 600. The decryption process will be described by referring to FIG. 14.

(Step S601: Key Reception Step)

The key reception unit 602 receives PK=(MPK, PQCPK) and USK=(PQCSK, SKΓ).

(Step S602: Ciphertext Reception Step)

The ciphertext reception unit 601 receives verification parameter CCHECK=(P-SS, P'-D, K') and ciphertext C=PQCC-DR.

(Step S603: Decryption Step)

First, the decryption unit 603 obtains M=(P-D, R) by executing the PQCDEC with the secret key PQCSK and ciphertext C=PQCC-DR as input.

Next, the decryption unit 603 calculates the P-D based on the P'-D using the random number R obtained. In a case where the P-D that is calculated does not match the P-D that an execution result of the PQCDEC indicates, the decryption unit 603 outputs 0. In a case where these P-Ds match, the decryption unit 603 obtains the KEY by executing the ABEDEC with, as input, the user secret key SKΓ, and the (P-SS, P-D) as a ciphertext of the attribute based encryption.

(Step S604: Output Step)

The result output unit 604 outputs the KEY.

*Description of Effect of Embodiment 1.*

As described above, according to the present embodiment, double encryption technology that is resistant to the quantum computer and that can verify whether or not the decryption of the attribute based encryption is possible without carrying out decryption and taking out the cleartext can be provided. According to the present embodiment, a data size of the ciphertext, processing time of the decryption, or the like does not depend on a maximum value decided by a system. Consequently, according to the present embodiment, post quantum attribute based encryption that is possible to be used more safely and efficiently can be achieved.

According to the present embodiment, as for the decryption-possible condition and the attribute set, the decryption-possible condition and the attribute set can be configured equally as attribute based encryption that is not post quantum cryptography, and correspondence confirmation between the decryption-possible condition and the attribute set can be executed separately from the decryption process. Consequently, according to the present embodiment, the double encryption technology can be efficiently operated as the attribute based encryption that is resistant to the quantum computer.

Here, effects of the present embodiment will be described using FIG. 15. "Quantum resistance" means that there is quantum computer resistance. As illustrated in (a) of FIG. 15, in the conventional art, since the functional encryption that is resistant to the quantum computer is directly configured by lattice cryptography technology, there is an issue where although there is an advantage of having quantum computer resistance, a configuration becomes complex because a configuration of functional encryption functions is complicated. On the other hand, according to the present embodiment, although the quantum computer resistance is inferior in some areas compared with the resistance that the conventional art has, the configuration is simplified compared with the configuration in the conventional art because the configuration is a combination of the post quantum cryptography and the functional encryption that are of the conventional art.

Effects of the present embodiment will be described using FIG. 16. Here, $C_0$ is a component that integrates as a whole and that is encoding a KEM key, and $C_i$ is a component of which an attribute in the L is encoded. As illustrated in (a) of FIG. 16, in the conventional art, there is an issue where the $key_{FE}$ is necessary to be decrypted to check the decryption-possible condition, and when the $key_{FE}$ is decrypted, an element ⨯ of the KEM key leaks. On the other hand, as illustrated in (b) of FIG. 16, according to the present embodiment, a component of the KEM key is protected by the PQC. Match determination for a parameter for checking the decryption-possible condition can be executed regardless of the PQC. Furthermore, since the match determination can be executed regardless of the element ζ of the KEM key, there is no risk of the element & of the KEM key leaking in the match determination.

*Other Configurations*

<Variation 1>

Figure 17:
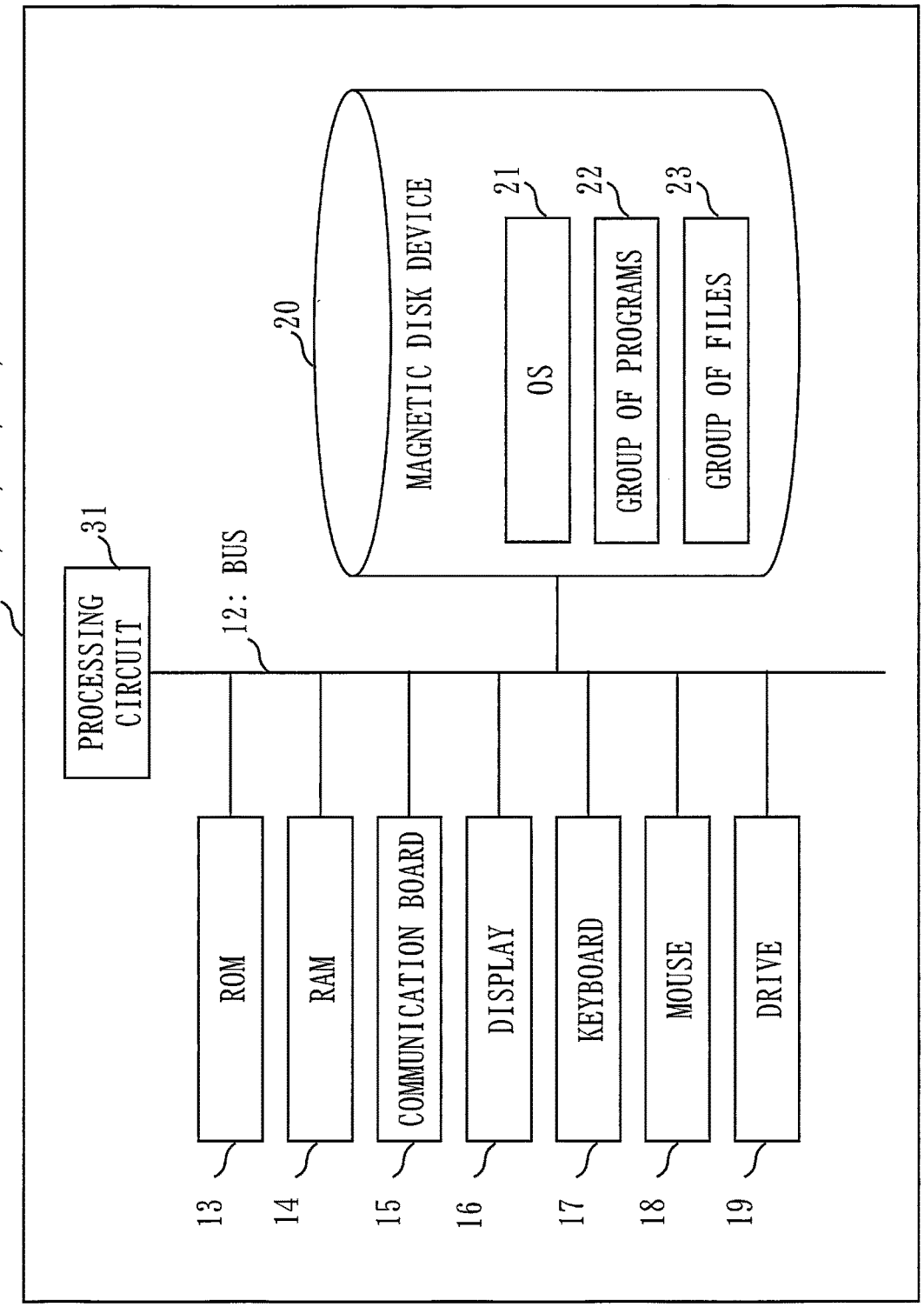
FIG. 17 is a diagram illustrating an example of a hardware configuration of each apparatus according to a variation of Embodiment 1.

FIG. 17 illustrates an example of a hardware configuration of each apparatus according to the present variation.

Each apparatus includes a processing circuit 31 instead of the CPU 11, the CPU 11 and the RAM 14, and the CPU 11 and the ROM 13, or the CPU 11, the RAM 14, and the ROM 13.

The processing circuit 31 is hardware that enables at least a part of each unit that each apparatus includes.

The processing circuit 31 may be dedicated hardware and may be a processor that executes a program stored in the RAM 14.

In a case where the processing circuit 31 is dedicated hardware, the processing circuit 31, as a specific example, is a single circuit, a composite circuit, a programmed processor, a parallel programmed processor, an ASIC (Application Specific Integrated Circuit), an FPGA (Field Programmable Gate Array), or a combination of these.

Each apparatus may include a plurality of processing circuits that replace the processing circuit 31. The plurality of processing circuits share roles of the processing circuit 31.

In each apparatus, some functions may be enabled by dedicated hardware and the rest of the functions may be enabled by software or firmware.

The processing circuit 31, as a specific example, is enabled by hardware, software, firmware, or a combination of these.

The CPU 11, the RAM 14, the ROM 13, and the processing circuit 31 are generically called "processing circuitry". That is, functions of each functional element of each apparatus are enabled by the processing circuitry.

Other Embodiments

Embodiment 1 has been described, but within the present embodiment, a plurality of parts may be combined and executed. Or, the present embodiment may be executed partially. In addition, various changes may be made to the present embodiment as necessary, and the present embodiment may be arranged and executed in any manner, either fully or partially.

The embodiment mentioned above is an essentially preferred example, and is not intended to limit the present disclosure, the application of the present disclosure, and the scope of use. The procedures described using the flowcharts and the like may be suitably changed.

REFERENCE SIGNS LIST

11: CPU; 12: bus; 13: ROM; 14: RAM; 15: communication board; 16: display; 17: keyboard; 18: mouse; 19: drive; 20: magnetic disk device; 21: OS; 22: group of programs; 23: group of files; 31: processing circuit; 100: cryptosystem; 101: Internet; 200: parameter generation apparatus; 201: input unit; 202: common parameter generation unit; 203:

transmission unit; 300: user secret key generation apparatus; 301: input unit; 302: key reception unit; 303: key generation unit; 304: key transmission unit; 400: encryption apparatus; 401: input unit; 402: key reception unit; 403: encryption unit; 404: ciphertext transmission unit; 405: key output unit; 500: decryption-possible verification apparatus; 501: ciphertext reception unit; 502: key reception unit; 503: verification unit; 504: result output unit; 600: decryption apparatus; 601: ciphertext reception unit; 602: key reception unit; 603: decryption unit; 604: result output unit.

The invention claimed is:

1. An encryption apparatus comprising:
processing circuitry to:
when a user secret key SKΓ is generated using a secret key MSK of attribute based encryption and a set of attributes Γ corresponding to a decryption-possible condition L,
generate a key K and a ciphertext P corresponding to the key K by encrypting the decryption-possible condition L by the attribute based encryption using, as an encryption key of the attribute based encryption, a key PK consisting of a public key MPK corresponding to the secret key MSK and a public key PQCPK of post quantum cryptography, regard a part of the ciphertext P where the decryption-possible condition L is encrypted based on a secret value as P-D, and regard a part of the ciphertext P where the secret value that is shared is encrypted as P-SS,
generate K' and P'-D by randomizing each of the key K and the P-D using a random number R, and
generate a ciphertext C by encrypting data consisting of the P-D and the random number R by the post quantum cryptography using the public key PQCPK, wherein
the P-SS, the P'-D, and the K' are decryption-possible verification parameters corresponding to the user secret key SKΓ.

2. A decryption apparatus comprising:
processing circuitry to:
when a user secret key SKΓ is generated using a secret key MSK of attribute based encryption and a set of attributes Γ corresponding to a decryption-possible condition L, a key K and a ciphertext P corresponding to the key K are generated by encrypting the decryption-possible condition L by the attribute based encryption using, as an encryption key of the attribute based encryption, a key PK consisting of a public key MPK corresponding to the secret key MSK and a public key PQCPK of post quantum cryptography, a part of the ciphertext P where the decryption-possible condition L is encrypted based on a secret value is regarded as P-D, a part of the ciphertext P where the secret value that is shared is encrypted is regarded as P-SS, K' and P'-D are generated by randomizing each of the key K and the P-D using a random number R, and a ciphertext C is generated by encrypting data consisting of the P-D and the random number R by post quantum cryptography using the public key PQCPK,
receive each of the ciphertext C, the P-SS, and the P'-D,
receive each of a secret key PQCSK corresponding to the public key PQCPK, and the user secret key SKΓ, and
decrypt the ciphertext C by the post quantum cryptography using the secret key PQCSK, calculate P-D based on the P'-D using the random number R, and in a case where P-D that a result of decrypting indicates and the P-D that is calculated match, decrypt data consisting of the P-SS and the P-D by the attribute based encryption using the user secret key SKΓ.

3. A decryption-possible verification apparatus comprising:
processing circuitry to:
when a user secret key SKΓ is generated using a secret key MSK of attribute based encryption and a set of attributes Γ corresponding to a decryption-possible condition L, a key K and a ciphertext P corresponding to the key K are generated by encrypting the decryption-possible condition L by the attribute based encryption using, as an encryption key of the attribute based encryption, a key PK consisting of a public key MPK corresponding to the secret key MSK and a public key PQCPK of post quantum cryptography, a part of the ciphertext P where the decryption-possible condition L is encrypted based on a secret value is regarded as P-D, a part of the ciphertext P where the secret value that is shared is encrypted is regarded as P-SS, K' and P'-D are generated by randomizing each of the key K and the P-D using a random number R, and the P-SS, the P'-D, and the K' are regarded as decryption-possible verification parameters corresponding to the user secret key SKΓ,
receive the decryption-possible verification parameter,
receive the user secret key SKΓ, and
decrypt the decryption-possible verification parameter by the attribute based encryption using the user secret key SKΓ, and in a case where the K' and a result of decrypting match, determine that the user secret key SKΓ is possible to be decrypted.

4. A cryptosystem comprising:
the encryption apparatus according to claim 1;
the decryption apparatus according to claim 2; and
the decryption-possible verification apparatus according to claim 3.

5. An encryption method comprising:
generating, when a user secret key SKΓ is generated using a secret key MSK of attribute based encryption and a set of attributes Γ corresponding to a decryption-possible condition L, a key K and a ciphertext P corresponding to the key K by encrypting the decryption-possible condition L by the attribute based encryption using, as an encryption key of the attribute based encryption, a key PK consisting of a public key MPK corresponding to the secret key MSK and a public key PQCPK of post quantum cryptography, regarding a part of the ciphertext P where the decryption-possible condition L is encrypted based on a secret value as P-D, and regarding a part of the ciphertext P where the secret value that is shared is encrypted as P-SS, by a computer;
generating K' and P'-D by randomizing each of the key K and the P-D using a random number R, by the computer; and
generating a ciphertext C by encrypting data consisting of the P-D and the random number R by the post quantum cryptography using the public key PQCPK, by the computer, wherein
the P-SS, the P'-D, and the K' are decryption-possible verification parameters corresponding to the user secret key SKΓ.

6. A non-transitory computer readable medium storing an encryption program that causes an encryption apparatus that is a computer to execute:
an encryption process, when a user secret key SKΓ is generated using a secret key MSK of attribute based encryption and a set of attributes Γ corresponding to a decryption-possible condition L,
- to generate a key K and a ciphertext P corresponding to the key K by encrypting the decryption-possible condition L by the attribute based encryption using, as an encryption key of the attribute based encryption, a key PK consisting of a public key MPK corresponding to the secret key MSK and a public key PQCPK of post quantum cryptography, to regard a part of the ciphertext P where the decryption-possible condition L is encrypted based on a secret value as P-D, and to regard a part of the ciphertext P where the secret value that is shared is encrypted as P-SS,
- to generate K' and P'-D by randomizing each of the key K and the P-D using a random number R, and
- to generate a ciphertext C by encrypting data consisting of the P-D and the random number R by the post quantum cryptography using the public key PQCPK, wherein the P-SS, the P'-D, and the K' are decryption-possible verification parameters corresponding to the user secret key SKΓ.

\* \* \* \* \*